United States Patent
Kanigicherla et al.

(10) Patent No.: US 9,268,717 B2
(45) Date of Patent: Feb. 23, 2016

(54) SHARING SINGLE ROOT IO VIRTUALIZATION PERIPHERAL COMPONENT INTERCONNECT EXPRESS DEVICES

(71) Applicant: INEDA SYSTEMS PVT. LTD, Hyderabad, Andhra Pradesh (IN)

(72) Inventors: Balaji Kanigicherla, Andhra Pradesh (IN); Dhanumjai Pasumarthy, Andhra Pradesh (IN); Kishor Arumilli, Andhra Pradesh (IN); Naga Murali Medeme, Andhra Pradesh (IN); Shabbir Haider, Andhra Pradesh (IN); Surya Narayana Dommeti, Andhra Pradesh (IN); Tapan Vaidya, Andhra Pradesh (IN)

(73) Assignee: INEDA SYSTEMS PVT. LTD., Hyderabad (IN)

( * ) Notice: Subject to any disclaimer, the term of this patent is extended or adjusted under 35 U.S.C. 154(b) by 0 days.

(21) Appl. No.: 14/285,550

(22) Filed: May 22, 2014

(65) Prior Publication Data
US 2015/0149661 A1    May 28, 2015

(30) Foreign Application Priority Data
Nov. 22, 2013    (IN) .............. 5400/CHE/2013

(51) Int. Cl.
*G06F 13/00* (2006.01)
*G06F 13/10* (2006.01)

(52) U.S. Cl.
CPC ........................ *G06F 13/10* (2013.01)

(58) Field of Classification Search
CPC ....................................... G06F 13/10
USPC ...................... 718/1; 710/104, 8–10
See application file for complete search history.

(56) References Cited

U.S. PATENT DOCUMENTS

| | | | | |
|---|---|---|---|---|
| 7,657,663 | B2 * | 2/2010 | Freimuth et al. | 710/5 |
| 8,359,415 | B2 * | 1/2013 | Brown et al. | 710/62 |
| 8,645,605 | B2 * | 2/2014 | Subramaniyan et al. | 710/313 |
| 8,751,713 | B2 * | 6/2014 | Ayzenfeld | G06F 13/105 710/104 |
| 9,003,071 | B2 * | 4/2015 | Liu | G06F 13/102 710/3 |
| 9,021,475 | B2 * | 4/2015 | Nimmagadda | G06F 9/5077 718/1 |
| 9,047,208 | B1 * | 6/2015 | Moore et al. | |
| 9,141,571 | B2 * | 9/2015 | Subramaniyan | G06F 13/28 |
| 2012/0167085 | A1 * | 6/2012 | Subramaniyan et al. | 718/1 |
| 2014/0331223 | A1 * | 11/2014 | Lee | G06F 13/105 718/1 |
| 2015/0052282 | A1 * | 2/2015 | Dong | 710/308 |
| 2015/0169331 | A1 * | 6/2015 | Nelogal | G06F 13/4022 710/108 |

* cited by examiner

Primary Examiner — Tammara Peyton
(74) Attorney, Agent, or Firm — Workman Nydegger

(57) ABSTRACT

Systems and methods for sharing a single root I/O virtualization (SR-IOV) device (106) amongst a plurality of roots (104) are described herein. The described systems implement a method which includes identifying a physical function (PF) and a plurality of virtual functions (VFs) associated with the SR-IOV device (106). The method also include generating at least one set of VFs from amongst the plurality of identified VFs, where each set of VFs include one or more VFs, and generating a pseudo PF (PPF) for each of the at least one set of VFs, where each PPF and a set of VFs associated with the PPF forms a projected SR-IOV device (106). The method further includes associating each of the projected SR-IOV device (106) with a root (104) from amongst the plurality of roots (104) to allow sharing of the SR-IOV device (106).

24 Claims, 4 Drawing Sheets

SHARING SINGLE ROOT IO VIRTUALIZATION PERIPHERAL COMPONENT INTERCONNECT EXPRESS DEVICES

CROSS-REFERENCE TO RELATED APPLICATIONS

This application claims priority to and the benefit of Indian Patent Application Serial No. 5400/CHE/2013, filed on Nov. 22, 2013, entitled "SHARING SINGLE ROOT IO VIRTUALIZATION PERIPHERAL COMPONENT INTERCONNECT EXPRESS DEVICES", which is incorporated herein in its entirety.

TECHNICAL FIELD

The present subject matter, in general, relates to peripheral component interconnect express (PCIe) devices and in particular to PCIe compliant single root input/output virtualization (SR-IOV) devices.

BACKGROUND

To meet the growing demands of homes and offices, virtualization technology is being extensively used in computing systems. In general, the virtualization technology allows a host processor to run multiple operating systems, also referred to as system images, and applications in independent partitions. In other words, one computing system with virtualization can function as multiple "virtual" systems. Furthermore, each of the virtual systems may be isolated from each other and may function independently.

In the recent past, virtualization has also been extended to cover I/O virtualization. I/O virtualization is a methodology which transforms accesses between standard I/O devices and host processors such that the I/O devices can be shared across multiple system images or hosts in a way which hides the sharing from both the host processor and the shared I/O devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
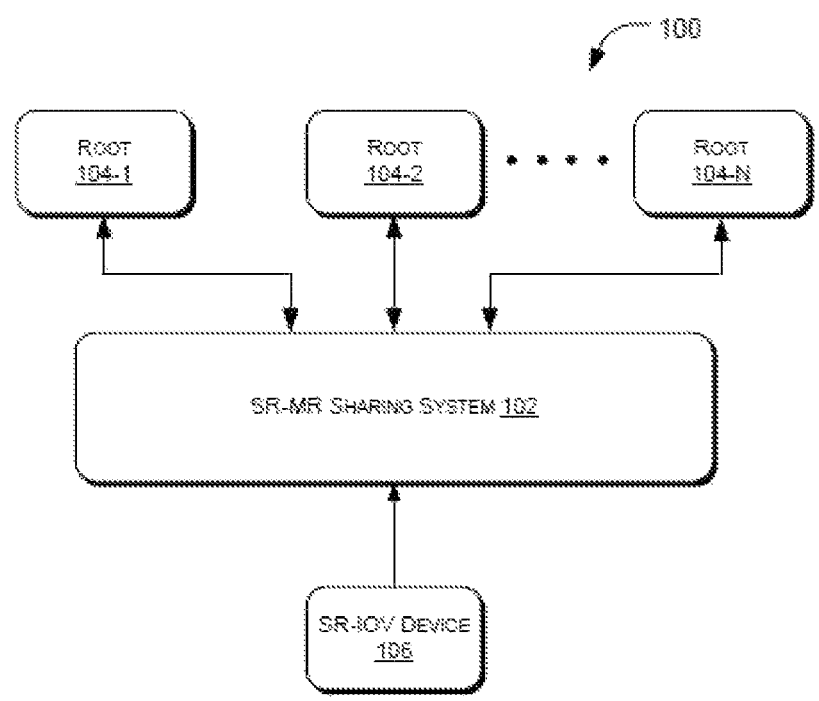
FIG. 1 illustrates an implementation of a SR-MR sharing system, in accordance with an embodiment of the present subject matter.

Systems and methods for sharing of Singe Root Input/output (I/O) virtualization (SR-IOV) devices among multiple roots in a multi-root environment are described. A multi-root environment can be understood as an environment where multiple independent Peripheral Component Interconnect (PCI) express (PCIe) hosts share a common set of PCIe hardware resources, such as one or more standard SR-IOV devices. For the sake of explanation, each independent PCIe host has been referred to as a root hereinafter. Although the description herein is for SR-IOV devices, the described systems and methods may also be implemented in situations where multiple roots are connected to one or more multi root I/O virtualization (MR-IOV) devices or a combination of SR-IOV and MR-IOV devices, albeit a few variations which will be apparent to those skilled in the art. Further, in situations where the MR-IOV devices are utilized, the systems and methods may implement the regular MR-IOV standard for the purpose of communication.

It will also be appreciated that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

Standards for PCIe based I/O virtualization, where multiple system images implemented on a root share PCIe resources, are specified by Peripheral Component Interconnect Special Interest Group (PCI-SIG) through the single root input-output virtualization (SR-IOV) standard. Based on the SR-IOV standard, conventionally, one or more I/O devices are shared among the multiple system images with the help of software, such as a hypervisor or a virtual machine manager (VMM). The devices which are capable of being virtualized among multiple system images, based on the SR-IOV standard, are generally referred to as SR-IOV devices. Further, the hypervisor or the VMM provides a platform for isolated execution of system images and, manages virtualization and access of the attached SR-IOV devices between the system images.

The SR-IOV devices may be virtualized among multiple system images by either being directly connected to the root that is implementing multiple system images or by being connected to a PCIe switch which is then connected to the root. SR-IOV standard is a widely accepted standard and several SR-IOV devices, such as SR-IOV Ethernet cards and SR-IOV Serial Attached SCSI (SAS) cards that support the standard are readily available.

The capabilities of the SR-IOV standard have been extended by a multi root input-output virtualization (MR-IOV) standard which provides mechanisms of sharing PCIe hardware resources, such as I/O devices, across multiple independent roots. The MR-IOV standard has been defined by the PCI-SIG to allow virtualization of the I/O devices between multiple roots and share PCIe hardware resources among independent roots thereby not limiting virtualization to system images. The devices which are capable of being virtualized among multiple roots are generally referred to as MR-IOV devices.

Since the implementation of multi root environment is becoming more and more common, the requirement of MR-IOV devices has been ever increasing. However, due to fair complexity of implementation, MR-IOV devices capable of being virtualized among multiple roots based on the MR-IOV standard are generally not readily available. Further, cost of each available MR-IOV product is significantly higher than those of SR-IOV devices. Also, since implementation of MR-IOV devices necessitates implementation of MR-IOV switches, and support softwares for proper functioning of a multi root environment, mechanisms of providing cost efficient solutions and sharing of readily available devices have become a challenge.

To this end, systems and methods for sharing of a SR-IOV devices among multiple roots in a multi root environment is described. The described methods would allow sharing of SR-IOV devices among multiple roots and would thus eliminate the requirement of high cost and scarcely available MR-IOV devices. Further, the described systems would allow implementation of SR-IOV device drivers at each root and would not warrant modifications to the existing vendor device drivers at the root level. In other words, a single SR-IOV device can be simultaneously shared among a plurality of roots based on the implementation of original device drivers and the PCIe described SR-IOV and MR-IOV standards.

In one implementation of the present subject matter, a single root-multi root (SR-MR) sharing system is implemented to simultaneously share SR-IOV device amongst multiple roots. Further, apart from the sharing of SR-IOV devices, the SR-MR sharing system allows independent PCIe hosts, also referred to as roots, to share common set of other PCIe hardware resources as well. According to an implementation of the present subject matter, virtual functions (VFs) associated with the SR-IOV device are categorised and segregated into multiple sets such that each set of VFs is allocated to a single root from amongst the plurality of roots. Further, corresponding to each set of VFs a pseudo physical function (PF) (PPF) is also generated such that the PPF can be provided to the root. Therefore, corresponding to each SR-IOV device, a plurality of PPFs and a plurality of VF sets may be generated and; corresponding to each generated PPF, a set of VFs may be associated such that for each root, a projected SR-IOV device is created.

It would be understood that each PPF can be treated as a separate projected SR-JOY device with its corresponding set of VFs as virtual functions of the projected SR-IOV. It would also be appreciated that PFs are full-featured PCIe functions of a SR-IOV device utilizing configuration resources while VFs are lightweight functions of the SR-IOV.

Hence, the SR-MR sharing system enables various independent roots to enumerate its own dedicated SR-IOV device based on the PPFs, for the connected SRIOV device. For the ease of understanding, the SR-IOV device as seen by the root is referred to a projected SR-IOV device and the SR-IOV device connected to the SR-MR sharing system is referred to as an actual SR-IOV device. Although the present description is with respect of sharing of a single SR-IOV device among a plurality of roots by the SR-MR sharing system, it would be understood that more than one SR-IOV devices may be shared among the plurality of roots based on the described techniques and mechanisms described.

In another implementation of the present subject matter, amongst other things, the SR-MR sharing system is capable of handling enumeration of SR-IOV devices such that multiple set of VFs can be generated and PPFs corresponding to each set of the VFs can be determined. Upon enumeration of the SR-IOV device, each PPF can be provided to each of the root as a projected SR-IOV device. In said implementation, the SR-MR sharing system may implement one or more configuration registers, base address registers (BARs), assignment tables, and mapping tables to enable the sharing of the actual SR-IOV device amongst the plurality of roots.

The SR-MR system may also control upstream and downstream routing of transaction layer packets (TLPs) based on address based routing, ID based routing, and multicast/broadcast routing. In one implementation, for the purpose of routing TLPs, the SR-MR sharing system may utilize the configuration registers, BARs, mapping tables, and assignment tables implemented during the enumeration of the SR-IOV device.

In another implementation of the present subject matter, the SR-MR sharing system may also handle interrupts generated for/by the SR-IOV device. Depending upon the projected SR-IOV device provided to each root and the VFs included in the projected SR-IOV device, the SR-MR sharing system may implement the interrupt handling for each root. Similar to the interrupt handling, depending upon the projected SR-IOV device provided to each root and the VFs included in the projected SR-IOV device, the SR-MR sharing system may implement the power management for the multi root environment.

Figure 2A:
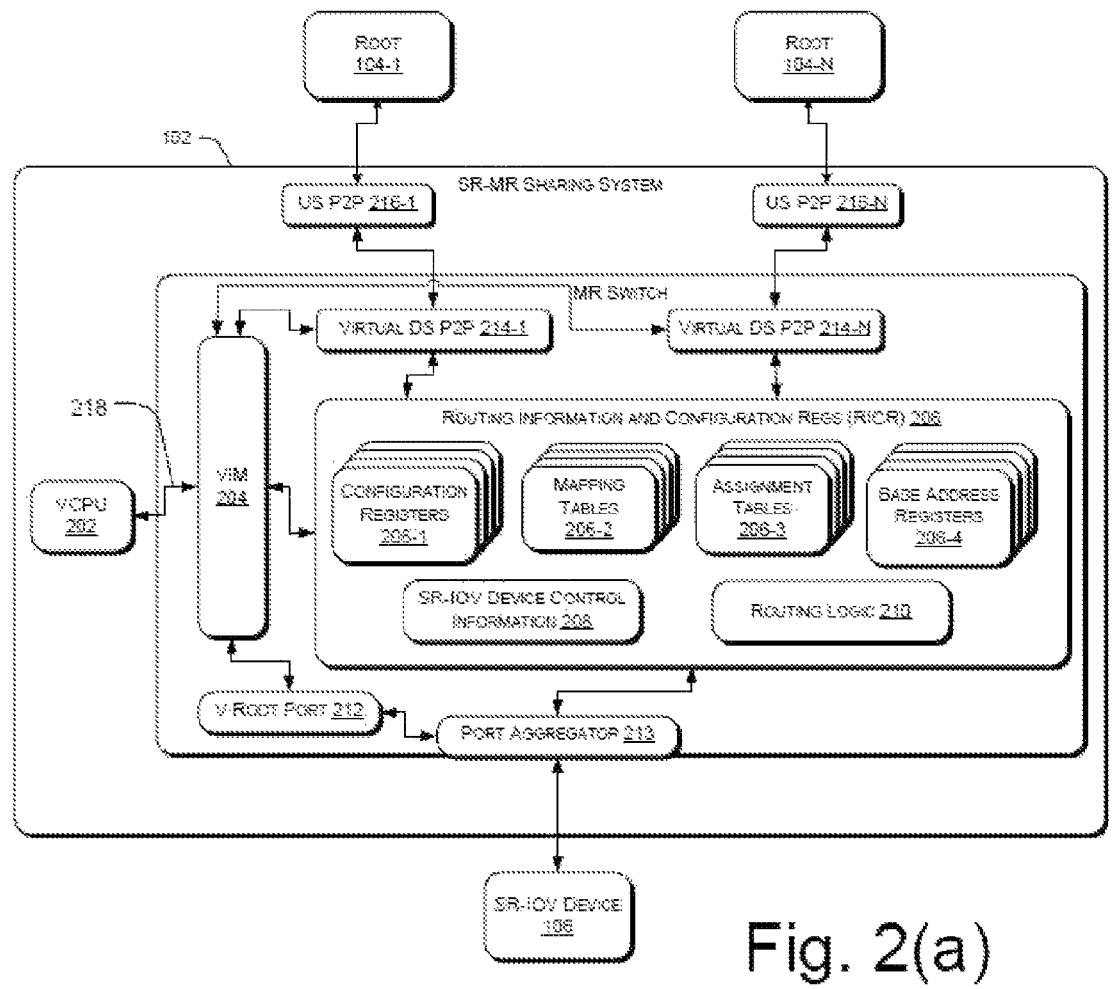
FIG. 2(a) illustrates different components of the SR-MR sharing system, in accordance with an embodiment of the present subject matter.
Figure 2B:
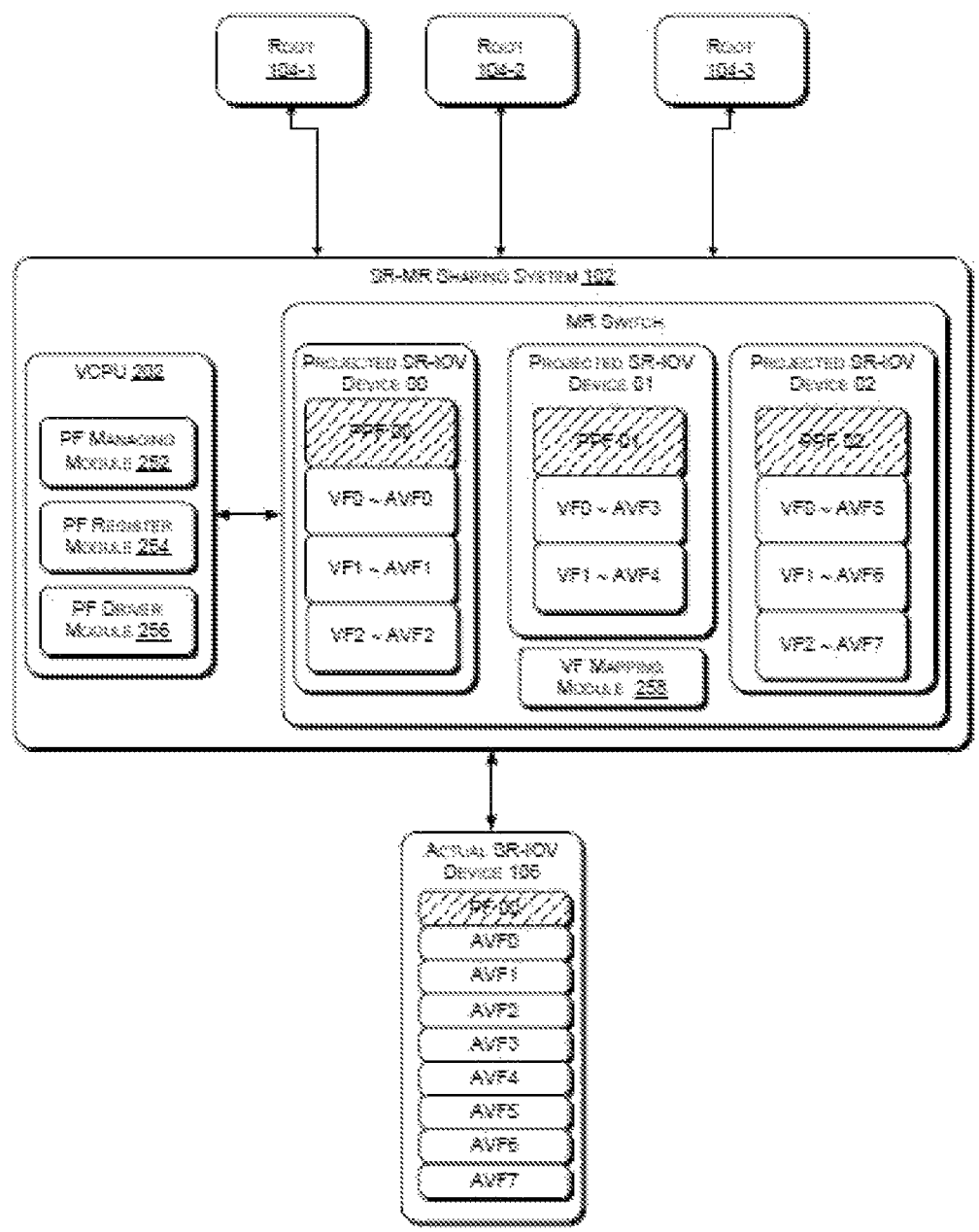
FIG. 2(b) illustrates a schematic of projected SR-IOV device implementation by the SR-MR sharing system, in accordance with another embodiment of the present subject matter.
Figure 3:
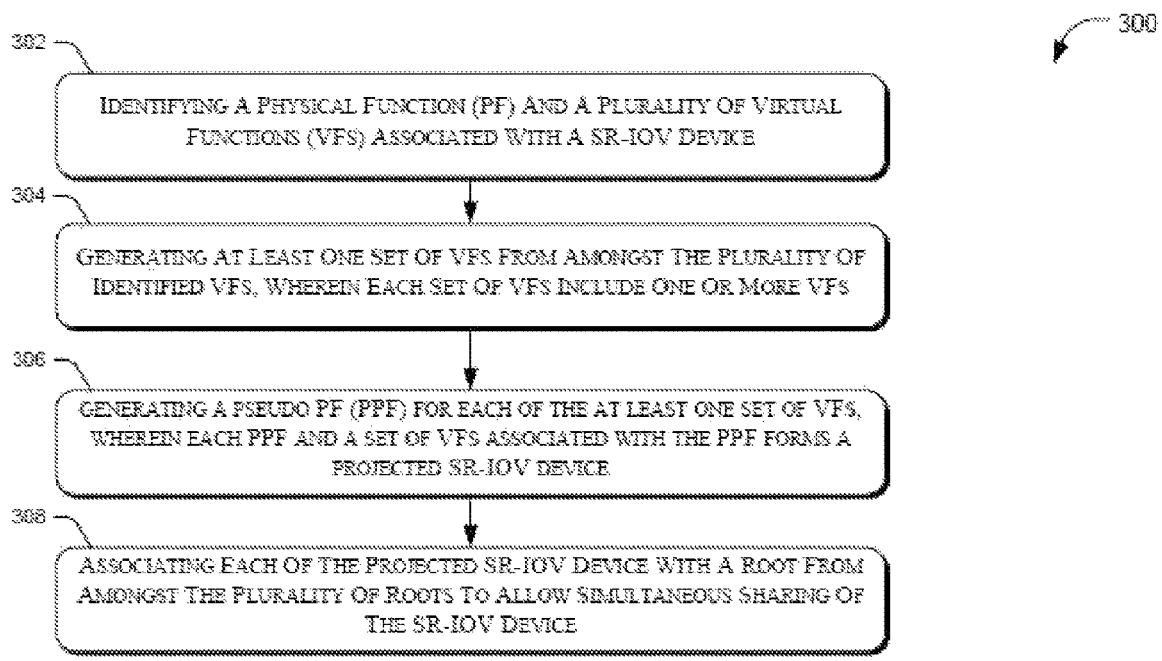
FIG. 3 illustrates a method of sharing a SR-IOV device among multiple roots, in accordance with an embodiment of the present subject matter.

The manner in which the described systems and methods to enable sharing of the SR-IOV device amongst a plurality of roots shall be implemented has been explained in details with respect to the FIGS. 1-3. While aspects of described systems and methods can be implemented in any number of different computing systems, transmission environments, and/or configurations, the embodiments are described in the context of the following exemplary system(s).

It should be noted that the description merely illustrates the principles of the present subject matter. It will thus be appreciated that those skilled in the art will be able to devise various arrangements that, although not explicitly described herein, embody the principles of the present subject matter and are included within its scope. Moreover, all statements herein reciting principles, aspects, and embodiments of the present subject matter, as well as specific examples thereof, are intended to encompass equivalents thereof.

Devices that can implement the disclosed system(s) and method(s) include, but are not limited to, desktop computers, hand-held devices, multiprocessor systems, microprocessor based programmable consumer electronics, laptops, network computers, minicomputers, mainframe computers, and the like.

FIG. 1 illustrates a system 100 implementing a Single Root Multi Root (SR-MR) sharing system 102, hereinafter referred to as the SR-MR sharing system 102, according to an implementation of the present subject matter. In said implementation, the system 100 includes root 104-1, 104-2, . . . , 104-N, collectively referred to as roots 104 and individually referred to as root 104 hereinafter. The system 100 further includes a SR-IOV device 106 which is simultaneously shared amongst the roots 104 by the SR-MR sharing system 102. Although a direct connection has been depicted in the figure, the root 104 and the SR-MR sharing system 102 may be coupled through a network, such as local area network (LAN), wide area network (WAN), and Internet.

Each root 104 would be understood as an independent PCIe host processor which is capable of communicating with PCIe hardware components based on either base PCIe standard or SR-IOV standard of PCI-SIG or MR-IOV standard of PCI-SIG. A root 104 is also referred to as root complex and the terms have been used interchangeable for the purpose of explanation. Further, the roots 104 may include microprocessors, microcomputers, microcontrollers, digital signal processors, central processing units, state machines, logic circuitries, and/or any devices that manipulate signals and data based on operational instructions. Among other capabilities, the roots 104 are individually configured to interact with the SR-MR sharing system 102.

Examples of the SR-IOV device 106 include SR-IOV USB devices, SR-IOV storage devices, SR-IOV communication devices, SR-IOV human interface devices, SR-IOV audio devices, etc. Generally, a SR-IOV device 106 includes a plurality of virtual functions (VFs) and a physical function (PF) for which control and configuration registers are managed by a root 104.

According to an implementation of the present subject matter, the SR-MR sharing system 102 may generate multiple pseudo physical functions (PPFs) for the SR-IOV device 106, and allocate a corresponding set of virtual functions associated with each pseudo functions. Further, in said implementation, the SR-MR sharing system 102 may also allocate one PPF to one root 104 such that the root 104 visualizes a SR-IOV device 106 connected to its ports, corresponding to the allocated PPF. As mentioned previously, the SR-IOV devices 106 visualized by each root 104 based on the PPF generated by the SR-MR sharing system 102 are referred to as projected SR-IOV devices 106. It would be appreciated that corresponding to one SR-IOV device 106, one projected SR-IOV device 106 may be present for each root. Further, it would also be appreciated that in situations where the SR-MR sharing system 102 shares multiple SR-IOV devices among multiple roots 104, each root 104 may visualize multiple projected SR-IOV devices 106, each corresponding to one actual SR-IOV device 106.

Therefore, in operation, each root 104 visualizes a projected SR-IOV device 106 as a dedicated SR-IOV device 106 based on the allocated PPF and, the root 104 also identifies one or more VFs associated with the PPF as the VFs of the projected SR-IOV device. In one implementation, the SR-MR sharing system 102 may also implement upstream and downstream peer to peer (P2P) bridges to enable communications between multiple roots 104 and the connected SR-IOV device 106. Further, the SR-MR sharing system 102 may also implement routing information and configuration registers corresponding to each projected SR-IOV device 106 to handle mapping and routing of various transaction layer packets (TLPs), such as including configuration requests, completion requests, and memory and I/O requests. Further, the SR-MR sharing system 102 may also handle power management and interrupts corresponding to the SR-IOV devices 106 while the SR-IOV device 106 is shared simultaneously among the multiple roots 104.

The implementation of different functionalities of the SR-MR sharing system 102 have been described in greater detail with respect to the description of FIG. 2(*a*) and FIG. 2(*b*). For the purpose of explanation and ease of understanding, the figures. FIG. 2(*a*) and FIG. 2(*b*) have been described together in the forthcoming description.

Referring to FIG. 2(*a*), a schematic implementation of the SR-MR sharing system 102 is described. According to the implementation, the SR-MR sharing system 102 includes a virtualization central processing unit (VCPU) 202 to control the sharing of the SR-IOV device 106 amongst the multiple roots 104. For the purpose of controlling the sharing of the SR-IOV device 106 amongst the plurality of roots 104, the VCPU 202 may implement various registers, tables and mapping criterion which may be exercised with the help of one or more other components of the SR-MR sharing system 102, described henceforth.

In one implementation, the VCPU 202 may be implemented as a control unit including processors, memory and interfaces. The processors, memory and the interfaces have not been shown for the sake of brevity. The memory may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

The VCPU 202 of the SR-MR sharing system 102 may interact with a virtual interface manager (VIM) 204 which provides an interface for the VCPU 202 to interact with other components of the SR-MR sharing system 102, and the SR-IOV device 106. The VIM 204 may handle physical port connection between the VCPU 202 and the SR-IOV device 106. Further, the VIM 204 may also act as an upstream and downstream interface for various requests and messages to be shared between the roots 104 and the SR-IOV device 106. For instance, for some transactions, such as configuration of pseudo PFs, the VIM 204 may act as a downstream interface. Similarly, the VIM may act as an upstream interface for some other transactions, such as memory write TLPs from the PFs of the actual SR-IOV device 106. In other words, the VIM 204 allows the VCPU 202 to act as a root for the actual SR-IOV device 106. In one implementation, the VIM 204 may allow communication of downstream data, such as configuration TLPs and may also allow routing of upstream data, such as completion TLPs, and memory read/write TLPs.

For the purpose of sharing the SR-IOV device 106 amongst the roots 104, the VCPU 202 may also handle routing information and different configuration registers, base registers, mapping tables and routing logic corresponding to each PPF and its corresponding set of VFs. Therefore, the VCPU 202 may handle routing information and configuration registers (RICR) 206 which may include one or more configuration registers 206-1, one or more mapping tables 206-2, one or more assignment tables 206-3, and base address registers (BARs) 206-4. The described set of RICR 206 may further include control information corresponding to the SR-IOV device 106, stored by the VCPU 202 as SR-IOV device control information 208.

In one implementation, the RICR 206 may be implemented as logic data structures by the VCPU 202. Further, the logic data structures of the RICR 206 may be stored by the VCPU 202 in a memory (not shown) of the SR-MR sharing system 102 or, a memory (not shown) accessible to the components of the SR-MR sharing system 102.

Further, the RICR 206 may also be implemented as hardware routing tables and logic structures which may include a routing logic 210 and also be managed by the VCPU 202 to share the SR-IOV device 106. In such a situation, the RICR 206 may be initialized by the VCPU 202 based on the implemented PPFs and generated corresponding projected SR-IOV devices 106 while the routing logic 210 may perform functions, such as data packet parsing, routing and interfacing.

The configuration registers 206-1 implemented by the VCPU 202 in the RICR 206 may be implemented for each of the PPF generated by the SR-MR sharing system 102 for the purpose of sharing the SR-IOV device 106. Similarly, the other registers and tables, such as the BARs 206-4 and the assignment tables 206-3 may be implemented for each of the PPF and the associated VFs representing the projected SR-IOV devices 106.

The SR-MR sharing system 102 may also include a virtualization root port 212 and a port aggregator 213 which may allow the VCPU 202 to handle physical port connected to the SR-IOV device 106 for the purpose of virtualization and data routing. The virtualization root port 212 may act as a physical port of VCPU 202, acting as a root, and provide the uplink data from the SR-IOV device 106 to the VCPU 202. Further, the virtualization root port 212 may also provide downlink data from the VCPU 202 to the SR-IOV 106, where the VCPU 202 acts as a root to the SR-IOV device 106.

The SR-MR sharing system 102 may further include upstream ports and downstream ports to allow communication between the roots 104 and the SR-IOV device 106. It can be understood that the SR-MR sharing system 102 also acts as a MR-IOV PCIe switch to route data between multiple roots 104 and the projected SR-IOV device 106 as if the SR-IOV device 106 is a MR-IOV device and the data is being communicated between the multiple roots and the MR-IOV device. Accordingly, the SR-MR sharing system 102 includes multiple virtual downstream ports, such as virtual DS P2P 214-1, . . . , virtual DS P2P 214-N. For the sake of explanation, the virtual downstream ports have been commonly referred to as virtual DS P2Ps 214 and individually referred to as virtual DS P2P 214. The virtual DS P2P 214 may receive data from one or more upstream ports of the SR-MR sharing system 102 and may provide the data to the VCPU 202 through the VIM 204. The upstream ports, such as US P2P 216-1, . . . , 216-N, may allow connection between the roots 104 and the SR-MR sharing system 102 through the virtual DS P2Ps 214.

Therefore, the above described components of the SR-MR sharing system 102 allow sharing of the SR-IOV device 106 amongst the multiple roots 104 based on implementation of different PPFs and VFs by handling of various requests and routing of data between the roots 104 and the SR-IOV device 106. The handling of such functionalities by the SR-MR sharing system 102 has been further described with the help of different modules and projected SR-IOV devices depicted in FIG. 2(b).

Referring to FIG. 2(b), the VCPU 202 may include different modules and data. The modules may include routines, programs, objects, components, data structures, and the like, which perform particular tasks or implement particular abstract data types. The different modules of the VCPU 202 may include a PF managing module 252, a PF register module 254, and a PF driver module 256. The described modules may either be coupled to the processors of the VCPU 202, or the root 104. In one implementation, the described modules may communicate with the root 104 and the different drivers of the SR-IOV device 106 running on the roots 104 such as host VF driver of the actual SR-IOV device 106 running on the roots 104. It would be understood that the host drivers may involve no additional change and be implemented as is on the roots 104.

In operation, upon determination of a connected SR-IOV device 106, the PF managing module 252 may emulate multiple projected SR-IOV devices 106 based on the number of roots configured to be connected to the connected SR-IOV device 106. In situations when a new SR-IOV device 106 is detected on the downstream port through the V root port 212 based on occurrence of a connect event, such as a reset or a hot plug insertion event, the PF managing module 252 may undertake physical port handling of the SR-IOV device 106. The PF managing module 252 may detect the SR-IOV device 106 and initiate its enumeration.

During the enumeration, to emulate multiple projected SR-IOV devices 106 corresponding to the connected SR-IOV device 106, the PF managing module 252 may identify the VFs associated with the connected SR-IOV device 106. The connected SR-IOV device 106 may include a single PF and 'm' VFs. It would be appreciated that the number of roots 104 'N' may be greater than, or equal to, or less than the number of VFs 'm' available with the connected SR-IOV device 106.

In one implementation of the present subject matter, the PF managing module 252 may initiate the enumeration of the connected SR-IOV device 106 for one or more roots 104. In said implementation, the PF managing module 252 may either receive an administrator's input or may query a previously saved profile to determine the roots to which the SR-IOV device 106 is to be assigned. Once such a determination is completed, the PF managing module 252 may generate different sets of VFs from the 'm' VFs identified earlier. The number of sets may be formed based on the number of roots 104 to which the SR-IOV device 106 is identified to be connected to.

For example, if based on a query of an existing saved profile, the PF managing module 252 determines that the connected SR-IOV device 106 is to be shared amongst 3 different roots 104, that is, among root 104-1, root 104-2, and root 104-3, the PF managing module 252 may generate 3 different sets of the identified 'm' VFs. Each set of VFs may include one or more VFs. For instance, if in the above example and as depicted in the FIG. 2(b), if the total number of 'm' VFs is equal to 8, the PF managing module 252, while distributing the VFs into 3 different sets, may form sets of 3, 2, and 3 VFs. Further, the first set of 3 VFs may be provided to the first root 104-1, the second set of VFs may be provided to the second root 104-2, and the third set of VFs may be provided to the third root 104-3.

In one implementation of the present subject matter, the PF managing module 252 may also create a mapping between the allocated VFs to each root 104 and the actual VFs (AVFs) through a VF mapping module 258 of the SR-MR sharing system 102. For instance, the actual VF0, VF1, and VF2 when allocated to root 104-1 may be enumerated by the root 104-1 as its VF0, VF1, and VF2. Further, the actual VF3, and VF4 when allocated to root 104-2 may be enumerated by the root 104-1 as its VF0, and VF1. Therefore, the VF mapping module 258 may create mapping tables 206-2 corresponding to the VFs in the RICR 206.

Although it has been described that all the VFs are divided into different sets of VFs, it would be understood that some of the VFs of the SR-IOV device 106 may not be assigned to any root 104. Further, the PF managing module 252 may not assign a set of VF to all roots 104 and based on the profile or the administrator's request, some of the roots 104 may also be not provided with any set of VFs at all.

Upon allocation of the set of VFs to corresponding roots 104, the PF register module 254 may then populate a PPF configuration for each root 104 based on the allocated set of VFs. For example, in the above described scenario, the PF register module 254 may generate a PPF00 for root 104-1, PPF01 for the root 104-2, and PPF02 for the root 104-3. Further, the PF register module 254 may also create configuration registers 206-1, assignment tables 206-3, and BARs 206-4 corresponding to each PPF and its associated VFs in the RICR 206.

Therefore, the PF managing module 252 and the PF register module 254 logically splits the monolithic SR-IOV device 106 into multiple projected SR-IOV devices 106, each visible to its associated root 104. As described earlier, the SR-IOV device 106 visible to each root 104 is referred to as projected SR-IOV device 106 and the SR-IOV device 106 physically connected to the SR-MR sharing system 102 is referred to as the actual SR-IOV device 106.

Upon enumerating the SR-IOV device 106 and creating sets of VFs and PPF for each root, the PF managing module 252 may then allow each root 104 to start their own enumeration corresponding to the projected SR-IOV device 106. The PF managing module 252 may make the roots 104 to wait for a connect event and their enumeration by withholding their reset signals. In another implementation, the PF managing module 252 may provide a hotplug insertion event to each of the root 104 so that the roots 104 can enumerate projected SR-IOV devices 106.

In operation, enumeration by each root 104 is captured and emulated by the PF managing module 252 of the VCPU 202. When a root 104 starts the enumeration process upon receiving the connect event, the PF configuration TLPs sent by the root are routed to the PF managing module 252 through the VIM 204. Further, the PF managing module 252 may send pseudo completion TLPs for the received PF configuration TLPs to the root 104 through the VIM 204. By capturing the configuration TLPs and sending the pseudo completed TLPs, the root 104 may enumerate the projected SR-IOV device 106 by reading the PPF and its pseudo configuration registers implemented in the RICR 206. Based on the total VFs in the PPF, the root 104 may enable as many VFs as it requires. In one implementation, the VF configuration TLPs received from the roots 104 may be modified based on the mapping tables 206-2 and the assignment tables 206-3 and then routed to the assigned VF in the actual SR-IOV device 106.

It would be understood that the assignment tables 206-3 and the mapping tables 206-2 may be updated by the PF register module 254 whenever a root 104 sends the initial configuration requests. The configuration requests from the root 104 may provide the BAR addresses and routing ID corresponding to the root 104 which may then be mapped by the PF register module 254 in the RICR 206. Further, the PF driver module 256 may provide routing IDs and VF BARs of the actual SR-IOV device 106 to the PF register module 254 and the PF managing module 252 to determine proper mapping logic and implementation of different mapping tables 206-2 and the BARs 206-4.

From the perspective of a root 104, the projected SR-IOV device 106 is a fully functional SR-IOV device 106, connected through the SR-MR sharing system 102 acting as a switch, where the functions of the switch are emulated by an upstream P2P 216 and a virtual downstream P2P bridge 214. Due to this, the device driver of the actual SR-IOV device 106 can be run on the root 104 without any modifications. As described earlier, after the root 104 enumerates the SR-IOV device 106, the modules of the VCPU 202 may update the tables and registers of the RICR 206. Such updation, for example, may include, the VFs that are enabled for each root 104, the BAR settings for each of the projected PFs and projected VFs, the ID mappings for each of the projected SR-IOV device VFs to actual SR-IOV device VFs in downstream direction, and ID mappings for actual SR-IOV device VFs to projected SR-IOV device VFs in upstream direction. It would be appreciated that the implementation of the RICR 206 is one of the many methods to capture route information through the SR-MR sharing system 102 and shall not be construed as a limitation of the present subject matter.

Upon complete enumeration of the SR-IOV device 106 by the SR-MR sharing system 102 and the roots 104, the SR-MR sharing system 102 may allow exchange of different PCIe requests between the roots 104 and the SR-IOV device 106. However, such PCIe requests and their corresponding TLPs may be modified by the SR-MR sharing system 102. In one implementation, the modification of TLPs is based on address based, ID based, and implicit routing mechanisms which are described henceforth.

In one implementation, the PF managing module 252 parses the PCIe request to identify the relevant root 104 and check the type of PCIe request. The PCIe request may either be a memory and I/O (MMIO) request, a configuration request, an ID routed message, or an implicitly routed multicast or a broadcast message.

In another implementation, the PCIe requests received from the roots 104 and the actual SR-IOV device 106 may be identified by the RICR 206 based on implemented parsers (not shown) to determine the type of PCIe request. Based on the determination, an appropriate action may be taken, as described henceforth.

In situations when it is identified that the downstream PCIe request is a MMIO request, such request may be routed based on address based routing. For a downstream MMIO request, either the PF managing module 252 or the RICR 206 may determine the 32/64 bit address embedded in the TLP of either the Memory or the I/O request. Upon the determination of the address of the downstream request, the VF mapping module 258 may determine a new address for the request based on RICR 206 where the configuration registers 206-1, mapping tables 206-2, assignment tables 206-3, and the BARs 206-4 are implemented for each of the projected SR-IOV device 106.

In one implementation, based on the determination of the new address, the PF managing module 252 may modify the received request and generate a modified request. Based on this new address, the modified request may be routed by the PF managing module 252 to the SR-IOV device 106 through the V root port 212 and the port aggregator 213. In one implementation when the determined destination address is of a PPF, the request may be routed to the VIM 204 and when the determined destination address is of a VF, the request may be routed to the actual SR-IOV device 106. For the requests corresponding to the PPFs, the VCPU 202 may determine a corresponding response and may provide the same to the root 104 from which the request was received.

In situations when the PF managing module 252 identifies the upstream PCIe request to be a MMIO request, the requester of the request may first be determined based on the tables and registers implemented in the RICR 206. In one implementation, based on the requester ID (RID) in the SR-IOV Device control information 208 stored in the RICR 206, the requester of the PCIe request may be identified. Once the same is completed, TLPs that are identified to be initiated by VFs (identified through RID lookup), the PF managing module 252 may match the address of the request against the BARs 206-4. As described earlier, the association of which virtual DS P2P bridge 214 with a VF is based on which VFs are assigned to a particular root as a projected SR-IOV device. Hence, once the address is matched and is found to be allowed to be routed upstream, the PF managing module 252 modifies the upstream MMIO PCIe request by replacing the function number in RID with the projected VF number through a lookup in the mapping tables 206-2. The modified PCIe request is then sent by the PF managing module to the root 104 to which the VF was assigned. All MMIO TLPs identified as being originated by the PF in the actual SRIOV device are routed to VCPU 202.

Similar to the handling of upstream and downstream MMIO PCIe requests, the SR-MR sharing system 102 may also handle other PCIe requests. In situations when the PF managing module 252 identifies a downstream PCIe request to be either a configuration request or an ID routed message, the PF managing module 252 may route the request based on ID based routing mechanism. In operation, the VF mapping module 258 may look up the mapping tables 206-2 and based on the identified ID, route the TLPs of the PCIe request the appropriate destination.

For instance, all the TLPs targeted for pseudo PFs may be routed to VIM 204 and the TLPs routed for projected VFs are routed to the actual SR-IOV device 106 after destination ID in the TLP is modified based on the mapping tables 206-2. But, the configuration TLPs that target configuration registers 206-1 which controls physical port and link attributes of the projected SR-IOV 106 are handled by the PF managing module 252. For the TLPs targeting the configuration registers 206-1, the PF managing module 252 may process these configuration TLP requests and generate an appropriate response for the root 104 from which the request was received. In one implementation, upon processing of the configuration TLPs, the PF managing module 252 may also issue modified configuration TLPs to the VFs of the actual SR-IOV device 106.

In situations when the PF managing module 252 identifies an upstream PCIe request to be routed utilizing the ID based routing mechanism, the PF managing module 252 may initiate the ID based routing mechanism. In situations when the ID based routing TLPs are issued by the PF of the actual SR-IOV device (identified through RID lookup), the PF managing module 252 may intercept the PCIe request and provide an appropriate response to the actual SRIOV device 106, if necessitated. In situations when ID based routing TLPs are identified to initiated by VFs (identified through RID lookup in RICR 206), the RID field in the TLP is replaced by the projected VF number (identified through a look up in the mapping tables 206-2 of the RICR 206) to generate a modified TLP. This modified TLP may then be provided to a root 104 to which the VF was assigned.

For the implicitly routed downstream and upstream multicast or broadcast messages, the PF managing module 252 may similarly determine the destination and the routing mechanism accordingly. For instance, for requests including TLPs that are routed to the projected SR-IOV device, the PF managing module 252 may generate a pseudo response if the request is for a PPF, or deliver the request to the actual VF after inferring the actual target thorough the tables of the RICR 206.

All PCIe requests including TLPs from PF of the actual SR-IOV device are received by the VCPU 202. The PF managing module 252 may route error messages received from the VFs and Vendor Defined Messages (VDMs) to either the associated root 104 and may also be provided to the VF mapping module 258 to keep track of the error indications in the configuration space of the associated PPFs. In one implementation, the PF managing module 252 may handle all other messages, such as the PM_PME messages, the PME_To_ACk messages, PF interrupts, and the locally terminated messages, such as VDM, INTX, and PM_Active_ST_Nack messages.

In one implementation, the PF managing module 252 may handle all interrupts of the VF in a similar manner as the upstream memory writes are handled. Since the details of handling MMIO have been explained earlier, the same have been omitted here for the sake of brevity.

According to an implementation of the present subject matter, SR-MR sharing system 102 may also handle power management and port state change events for the roots 104 and the SR-IOV device 106, with the help of the VCPU 202. In said implementation, to handle power management, the PF managing module 252 may parse all power management requests, such as a PME_Turn_Off message, and take appropriate action.

In one implementation, the PF managing module 252 may intercept the PME_Turn_Off message send a PME_TO_Ack message to the root 104 as a response, without providing the actual received request to the SR-IOV device 106. In such implementation, the PF managing module 252 may aggregate the PME_Turn_Off messages from all roots 104 and as necessitated, issue the PME_Turn_Off to the actual SR-IOV device 106.

Similarly, when the actual SR-IOV device 106 sends a PME_TO_Ack TLP upstream, it may be intercepted by the PF managing module 252, if necessitated, the PF managing module 252 may send this as multiple PME_TO_Ack messages to each root 104 to which the SR-IOV device 106 is projected to.

In another implementation of the present subject matter, the VCPU 202 may also handle downstream port related physical port state change events for the virtual DS P2P bridge 214. When a root 104 issues a port disable, link retrain, etc., type of port related state change requests, the request is intercepted by the PF managing module 252. Upon interception of such requests, the PF managing module may generate and send the appropriate response, if needed, to the particular host. The PF managing module 252 may aggregate all such requests from all the roots 104 and may issue the resulting physical port state change request to the actual SR-IOV device appropriately. For example, if all the roots 104 issue link disable requests, the PF managing module 252 may issue a link disable to the V Root port 212 which disables the PCIe link connected to the actual SR-IOV device 106.

Hence, based on the above described scenario of routing messages and data packets, it would be understood that an event flow from a root 104 to the SR-IOV device 106 occurs in the following manner. All the data IO from the VF driver of the roots directly go from the root 104 to the actual SR-IOV device 106 using the VF mapper information, which provides a mapping between roots VF register spaces and its ID to actual SR-IOV device VF register space, stored in the RICR 206. Further, all PF configuration related IO from the root 104 is processed by the VCPU 202 and is mapped to the PPF register space stored in the RICR 206. Based on the identification of the actual SR-IOV device state, the PF managing module 252 may interact with the actual SR-IOV PF through the PF driver module 256, via the V root port 212.

Similarly, it would be understood that an event flow from the actual SR-IOV device 106 to the roots 104 occurs in the following manner. All the data IO from VFs directly go to the roots using the VF mapper information stored in the RICR 206 which provides a mapping between actual SR-IOV device VF space and root VF space. The VF interrupts generated by the actual SR-IOV device 106 are routed to respective roots 104 to which the VF of the actual SR-IOV device 106 is associated. This routing is based on the mapping info implemented by the VCPU 202 through the VF mapping module 258 in the RICR 206. Further, the PF interrupts of the actual SR-IOV device 106 may be intercepted by the VCPU 202 and the PF managing module may route the same to all the roots 104 or a specific root based on the nature of the interrupt.

FIG. 3 illustrates a method 300 for sharing a single root I/O virtualization (SR-IOV) device amongst a plurality of roots, in accordance with an implementation of the present subject matter. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media.

At block 302, a physical function (PF) and a plurality of virtual functions (VFs) associated with the SR-IOV device are identified. In one implementation, the SR-IOV device may have more than one VFs and a PF to be associated to a root for functioning. The SR-IOV device may be a PCIe compliant device which is capable of being virtualized based on SR-IOV standard specified by PCI-SIG.

At block 304, at least one set of VFs from amongst the plurality of identified VFs is generated. In one implementation, each set of VFs include one or more VFs. In said implementation, the VFs may not be shared among the set of VFs generated. That is, one VF when allocated to a set of VFs may not be again allocated to another set of VFs and therefore, one virtual function may reside in one set of VFs.

At block 306, a pseudo PF (PPF) is generated for each of the at least one set of VFs. In one implementation, the PPF generated for each of the set of VFs also includes generation of configuration registers and BARs corresponding to the SR-IOV device to emulate the functionalities of the PF of the SR-IOV device to the root 104. Further, each PPF along with the set of VFs associated with it may form a projected SR-IOV device for the roots 104.

At block 308, each of the projected SR-IOV device is associated with a root 104 from amongst the plurality of roots 104 to allow simultaneous sharing of the SR-IOV device. In one implementation, the projected SR-IOV device includes a PPF and an associated set of VFs which correspond to the VFs of the SR-IOV device.

Although implementations for sharing a SR-IOV device amongst a plurality of roots have been described in language specific to structural features and/or methods, it is to be understood that the appended claims are not necessarily limited to the specific features or methods described. Rather, the specific features and methods are disclosed as exemplary implementations for sharing a SR-IOV device amongst the plurality of roots.

We claim:

1. A method for sharing a single root I/O virtualization (SR-IOV) device amongst a plurality of roots the method comprising:
   identifying a physical function (PF) and a plurality of virtual functions (VFs) associated with the SR-IOV device;
   generating at least one set of VFs from amongst the plurality of identified VFs, wherein each set of VFs include one or more VFs;
   generating a pseudo PF (PPF) for each of the at least one set of VFs, wherein the PPF is based on the PF and virtualizes the SR-IOV device, and wherein a set of VFs and a corresponding PPF forms a projected SR-IOV device; and
   associating the projected SR-IOV device with a root from amongst the plurality of roots to allow sharing of the SR-IOV device, wherein the project SR-IOV device utilizes device drivers of the SR-IOV device without modification, and wherein upstream and downstream peer to peer bridges enable the sharing of the SR-IOV device by the plurality of roots.

2. The method as claimed in claim 1, wherein the method further comprises generating routing information and configuration registers (RICR) for each of the projected SR-IOV device, wherein the associating is based on the RICR.

3. The method as claimed in claim 2, wherein the RICR comprises at least one of configuration registers, base address registers (BARs), mapping tables, and assignment tables for each of the projected SR-IOV device.

4. The method as claimed in claim 1, wherein the identifying is based on a connect event, and wherein the connect event is one of a hot plug insertion and a reset event.

5. The method as claimed in claim 2, wherein the method further comprises:
   receiving a PCIe transaction layer packet (TLP) from at least one root;
   identifying at least one of the configuration registers, base address registers (BARs), mapping tables, and assignment tables associated with the projected SR-IOV device associated to the at least one root;
   modifying the PCIe TLP based on the identified configuration registers, base address registers (BARs), mapping tables, and assignment tables to generate a modified PCIe TLP; and
   providing the modified PCIe TLP to the SR-IOV device.

6. The method as claimed in claim 5, wherein the modifying is based on address of PCIe TLPs, and wherein the PCIe TLP is at least one of a memory and an I/O request.

7. The method as claimed in claim 5, wherein the modifying is based on ID of the PCIe TLP, and wherein the PCIe TLP is at least one of configuration request, completion message, and an ID routed message.

8. The method as claimed in claim 5, wherein the method comprises:
   updating the configuration registers, the base address registers (BARs), the mapping tables, and the assignment tables, wherein the PCIe TLP is a VF configuration PCIe TLP; and
   generating a new VF configuration PCIe TLP for the SR-IOV device based on the received VF configuration PCIe TLP.

9. The method as claimed in claim 1 further comprising:
   receiving a PCIe TLP from the SR-IOV device;
   intercepting the PCIe TLP from the SR-IOV device to determine nature of the PCIe TLP, wherein the nature of the PCIe TLP is one of a VF PCIe TLP, and a PF PCIe TLP;
   modifying the PCIe TLP based on configuration registers, base address registers (BARs), mapping tables, and assignment tables associated with a VF of the SR-IOV device, wherein the PCIe TLP is a VF PCIe TLP; and
   providing the modified PCIe TLP to at least one root.

10. A single root-multi root (SR-MR) sharing system for sharing a single root I/O virtualization (SR-IOV) device amongst a plurality of roots, the SR-MR sharing system comprising:
    a virtual central processing unit (VCPU) to:
    identify a physical function (PF) and a plurality of virtual functions (VFs) associated with the SR-IOV device;
    generate at least one set of VFs from amongst the plurality of identified VFs, wherein each set of VFs include one or more VFs;
    generate a pseudo PF (PPF) for each of the at least one set of VFs, wherein the PPF is based on the PF and supports single root I/O virtualization and sharing, and wherein each PPF and a set of VFs associated with the PPF forms a projected SR-IOV device; and
    send the connect event to the plurality of roots to associate each of the projected SR-IOV device with a root from amongst the plurality of roots to allow sharing of the SR-IOV device, wherein the project SR-IOV device utilizes device drivers of the SR-IOV device without modification, and wherein upstream and downstream peer to peer bridges enable the the connect event between the plurality of roots and the SR-IOV device.

11. The SR-MR sharing system as claimed in claim 10, wherein the SR-MR sharing system further comprises a routing information and configuration register (RICR), wherein the RICR includes configuration registers and routing information tables for each of the projected SR-IOV device, and wherein the sending of the connect event is based on the configuration registers and routing information of the RICR.

12. The SR-MR sharing system as claimed in claim 11, wherein the RICR comprises at least one of configuration registers, base address registers (BARs), mapping tables, and assignment tables.

13. The SR-MR sharing system as claimed in claim 10, wherein the RICR comprises a routing logic to modify a PCIe TLP received from at least one root, based on address of the PCIe TLP, and wherein the PCIe TLP is at least one of a memory and an I/O request.

14. The SR-MR sharing system as claimed in claim 11, wherein the RICR:
intercepts a PCIe TLP from the SR-IOV device to determine nature of the PCIe TLP, wherein the nature of the PCIe TLP is one of a VF PCIe TLP, and a PF PCIe TLP;
modifies the PCIe TLP, on determining the PCIe TLP to be a VF PCIe TLP, based on configuration registers, base address registers (BARs), mapping tables, and assignment tables associated with a VF of the SR-IOV device; and
provides the modified PCIe TLP to at least one root.

15. The SR-MR sharing system as claimed in claim 14, wherein the RICR modifies the PCIe TLP based on an ID of the PCIe TLP, and wherein the PCIe TLP is at least one of completion message, and an ID routed message.

16. The SR-MR sharing system as claimed in claim 10, wherein the SR-MR sharing system comprises:
at least one upstream peer to peer (DS P2P) bridge to receive a PCIe TLP from at least one root; and
at least one viltual downstream peer to peer (DS P2P) bridge to provide the PCIe TLP received by the DS P2P, to the VCPU.

17. The SR-MR sharing system as claimed in claim 16, wherein the VCPU comprises a PF managing module to:
intercept the PCIe TLP to identify status of the SR-IOV device based on at least one of configuration registers, base address registers (BARs), mapping tables, and assignment tables associated with the projected SRIOV device corresponding to the at least one root;
generate a new PCIe TLP based on the identified status of the SR-IOV device; and
provide the new PCIe TLP to the SR-IOV device through a V root port.

18. The SR-MR sharing system as claimed in claim 16, wherein the VCPU comprises a PF managing module to:
determine the PCIe TLP to be a power management PCIe TLP; and
intercept the power management PCIe TLP to identify status of the SR-IOV device based on at least one of configuration registers, base address registers (BARs), mapping tables, and assignment tables associated with the projected SR-IOV device corresponding to the at least one root.

19. The SR-MR sharing system as claimed in claim 18, wherein the PF managing module further provides a new power management PCIe TLP to the SR-IOV device based on the identified status of the SR-IOV device.

20. The SR-MR sharing system as claimed in claim 16, wherein the VCPU comprises a PF managing module to:
determine the PCIe TLP to be a port state change PCIe TLP; and
intercept the port state change PCIe TLP to identify status of the SR-IOV device based on at least one of configuration registers, base address registers (BARs), mapping tables, and assignment tables associated with the projected SR-IOV device corresponding to the at least one root.

21. The SR-MR sharing system as claimed in claim 20, wherein the PF managing module further provides a new port state change PCIe TLP to the SR-IOV device based on the identified status of the SR-IOV device.

22. The SR-MR sharing system as claimed in claim 10, wherein the SR-MR sharing system comprises a V root port to receive a PCIe TLP from the SR-IOV device.

23. The SR-MR sharing system as claimed in claim 22, wherein the VCPU comprises a PF managing module to:
intercept the PCIe TLP from the SR-IOV device to determine nature of the PCIe TLP, wherein the nature of the PCIe TLP is one of a VF PCIe TLP, and a PF PCIe TLP;
modify the PCIe TLP based on configuration registers, base address registers (BARs), mapping tables, and assignment tables associated with a VF of the SR-IOV device, wherein the PCIe TLP is a VF PCIe TLP; and
provide the modified PCIe TLP to at least one root.

24. The SR-MR sharing system as claimed in claim 22, wherein the PF managing module:
intercepts the PCIe TLP from the SR-IOV device;
generates a new PCIe TLP for the at least one root, wherein the PCIe TLP received from the SR-IGV device is a PF PCIe TLP; and
provides the new PCIe TLP to the at least one root.

* * * * *